United States Patent Office 3,484,447
Patented Dec. 16, 1969

3,484,447
4,4'-(BIS N,N'-CARBAMYL METHYL) TETRAHYDROBIPYRIDYLS
John Edward Colchester and John Hubert Entwisle, Runcorn, England, assignors to Imperial Chemical Industries Limited, London, England, a corporation of Great Britain
No Drawing. Filed Apr. 11, 1966, Ser. No. 541,506
Claims priority, application Great Britain, Mar. 29, 1966, 14,775/66
Int. Cl. C07d 29/40, 57/00
U.S. Cl. 260—295          2 Claims

ABSTRACT OF THE DISCLOSURE

Tetrahydro-4,4'-dipyridyls and a process for their manufacture by reducing an N-substituted pyridinium salt. These compounds may usefully be converted to bipyridylium salts by dehydrogenation or oxidation.

This invention relates to a process for the manufacture of organic bases, and more particularly for the manufacture of N,N'-disubstituted tetrahydro-4,4'-bipyridyls.

It is known that N-substituted pyridinium salts, for example N-ethyl and N-benzyl pyridinium salts can be reduced either electrolytically or by means of sodium amalgam to form the corresponding N,N'-disubstituted tetrahydro-4,4'-bipyridyls.

We have now found that surprisingly this process can be adapted to provide other tetrahydro-4,4'-bipyridyl derivatives having carbamidoalkyl substitutents on the nitrogen atoms. According to our invention we provide these as new compounds, useful as intermediates in making the corresponding disubstituted-4,4'-bipyridylium salts which have hitherto been available only by the interaction of 4,4'-bipyridyl with a chloroacetamide or an analogue thereof.

According to our invention we also provide a process for the production of tetrahydro-4,4'-bipyridyls having as N-substituent on each nitrogen atom a group of the form —R$_1$—CO—NR$_2$R$_3$ wherein R$_1$ is a hydrocarbon radical (particularly the methylene group —CH$_2$—) and R$_2$ and R$_3$ are hydrocarbon or substituted hydrocarbon radicals, or wherein R$_2$ and R$_3$, together with the nitrogen atom to which they are attached, make up a heterocyclic ring (for example a piperidine pyridinium salt having the corresponding N-substituent).

The reduction may be carried out electrolytically at the cathode of a cell having an aqueous alkaline electrolyte, and using a cathode made of mercury, lead, or another metal of high hydrogen overpotential.

Alternatively the reduction may be carried out using an alkali metal amalgam, particularly sodium amalgam. We prefer to carry out the reduction at a temperature in the range 0 to 100° C.

The invention may be applied to produce compounds having a wide variety of N-substituents, but there may be mentioned in particular the tetrahydrobipyridyl derivatives in which the N-substituents are for example —CH$_2$—CO—N(C$_2$H$_5$)$_2$, —CH$_2$—CO—N[CH(CH$_3$)$_2$]$_2$,

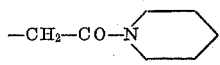

or

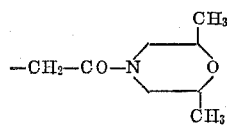

These tetrahydrobipyridyl derivatives may be isolated either directly as solids by cooling the reaction mixture in which they are formed, or by extraction with an organic solvent. The products are useful for conversion to the corresponding bipyridylium salts by dehydrogenation or oxidation.

The invention is illustrated by the following examples in which the parts and percentages are by weight unless otherwise stated.

EXAMPLE 1

20 grams of the quaternary salt made by reaction N,N'-diethyl chloroacetamide with pyridine were dissolved in 400 ml. of water, and the solution was stirred with 736 gms. of sodium amalgam containing 4 gms. of sodium for 15 minutes at 20–25° C. There were thus obtained 10 gms. of a solid material of the formula:

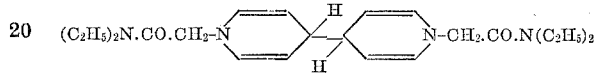

This yield corresponds to 59% of theory, based on the pyridinium salt used.

EXAMPLE 2

An electrolytic cell with a mercury cathode, platinum anode and a porous alumina diaphragm was set up. The anolyte was 100 ml. of a 5 M aqueous solution of sodium chloride and the catholyte was 300 ml. of an 5 M aqueous solution of sodium chloride in which were dissolved 20 gms. of the quaternary salt made by reacting N-chloroacetyl piperidine with pyridine. The catholyte was stirred under an atmosphere of nitrogen and electrolysis was carried out for 75 minutes at a constant current of 1 ampere (cathodic current density 0.02 amp./sq. cm.). There was thus obtained 8.5 gms. of a solid material of the formula:

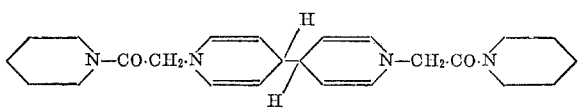

This yield corresponds to 49% of theory based on the pyridinium salt used, and a current efficiency of 88.6%.

What we claim is:
1. A compound of the formula:

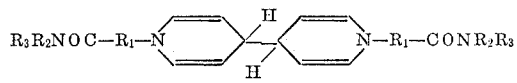

wherein R$_1$ is methylene, and R$_2$ and R$_3$ are each ethyl or propyl, or when taken together with the nitrogen to which they are attached form piperidino or morpholino.

2. A compound according to claim 1 wherein R$_2$ and R$_3$ are ethyl or propyl.

References Cited

UNITED STATES PATENTS 3,251,839   5/1966   Downes et al. _____ 260—246

ALEX MAZEL, Primary Examiner
J. TOVAR, Assistant Examiner

U.S. Cl. X.R.
204—74; 260—246, 294